United States Patent [19]

Halmø et al.

[11] 4,115,497
[45] Sep. 19, 1978

[54] PROCESS FOR THE PRODUCTION OF PRESSED BODIES FROM MUNICIPAL REFUSE

[75] Inventors: Terje Martin Halmø; Liv Skoglund, both of Trondheim, Norway

[73] Assignee: Elopak A/S, Spikkestad, Norway

[21] Appl. No.: 746,550

[22] Filed: Dec. 1, 1976

[30] Foreign Application Priority Data

Dec. 1, 1975 [NO] Norway .............................. 754035

[51] Int. Cl.² .............................................. B29J 1/00
[52] U.S. Cl. .................................. 264/115; 264/122; 209/138
[58] Field of Search ................ 264/115, 109, 122, 22; 100/39, 73, 74, 75; 209/133, 138, 139

[56] References Cited

U.S. PATENT DOCUMENTS

| | | | |
|---|---|---|---|
| 3,671,615 | 6/1972 | Price | 264/115 |
| 3,736,221 | 5/1973 | Evers et al. | 264/115 |
| 3,903,229 | 9/1975 | Mark | 264/115 |

Primary Examiner—Robert F. White
Assistant Examiner—James R. Hall

[57] ABSTRACT

Process for the production of pressed bodies from municipal refuse or waste, especially refuse having a content of wood-based materials, plaster and animal and vegetable substances, in which the refuse is subjected to a treatment for reducing particle size as well as for the separation of metals and similar hard, inorganic fractions. After collection, the refuse is divided up without the addition of fluid and is thereafter dried in a hot gas to reduce the water content. The particles of refuse material are screened in an air stream to separate heavy fractions and thereafter are pressed to pressed bodies during the addition of an adhesive and/or binding agent.

8 Claims, 1 Drawing Figure

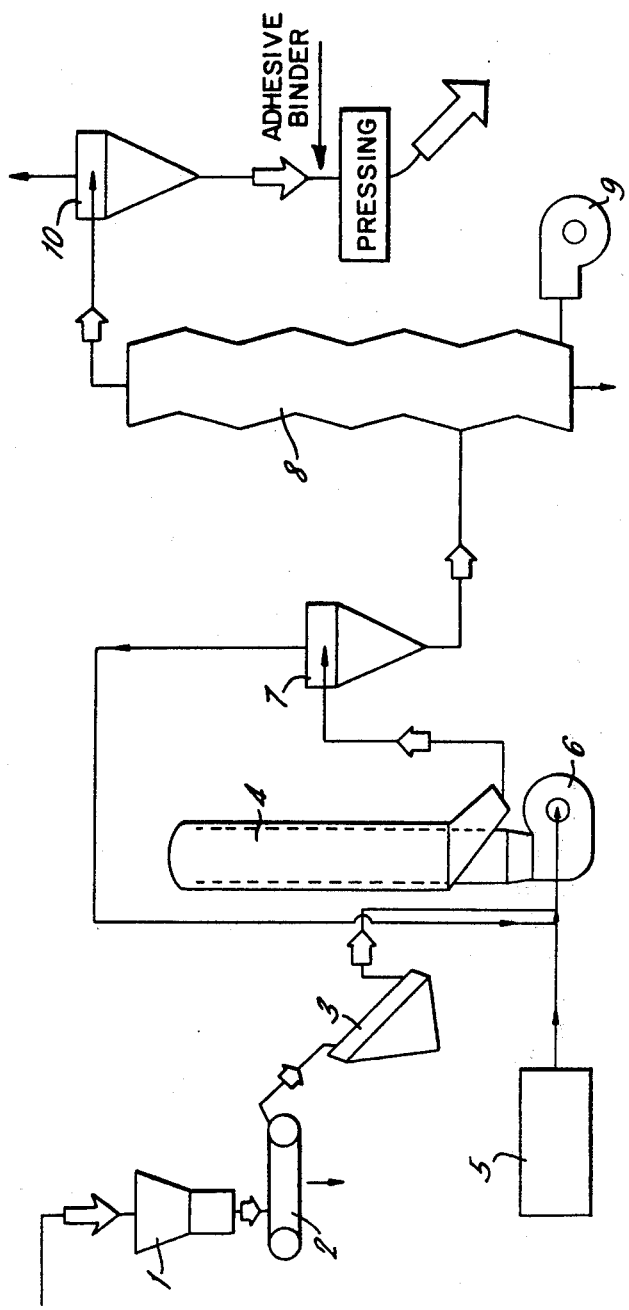

PROCESS FOR THE PRODUCTION OF PRESSED BODIES FROM MUNICIPAL REFUSE

BACKGROUND OF INVENTION

1. Field of Invention

This invention relates to a process for the production of pressed bodies from municipal waste or refuse, especially that having a content of wood-based materials, plaster and animal and vegetable substances.

Such refuse which includes household garbage, office and shop litter and certain types of industrial refuse which can be accepted at public garbage dumps, has a certain intrinsic value by virtue of its content of substances in demand. It causes a series of problems and involves expense in that it must be conveyed away and occupies useful space.

2. Description of the Prior Art

Known processes for the treatment of the aforesaid municipal refuse have not been able to make a raw material for further treatment within the current economic framework. It has also been difficult to produce a refuse product suitable for use for most types of further refinement, such as the manufacture of construction sheets or plates and the like.

Swiss patent specification No. 542,292 (Jetzer) describes the production of pressed bodies, especially of fibrous material, in which there is effected an aerobic decomposition of the raw material, primarily for the breakdown of certain organic substances. The assumption has probably been that such substances, especially in food waste, will make it difficult to produce the desired, pressed products or at least will have an unfavourable effect on the quality of those products. The initial composting or aerobic decomposition, moreover, involves a number of disadvantages. There is a demand for equipment and space for carrying out the treatment of the refuse. In addition, such treatment takes time and hence results in direct operational expenses. Furthermore, composting involves the risk of later growth of micro-organisms in the refuse material. This can be counteracted by the addition of preservatives but in quantities exceeding those which would otherwise be necessary.

All these factors make the Jetzer process uneconomic for the treatment of most types of refuse, at least as compared with the alternative costs for the treatment of refuse and production of pressed bodies, for example, construction sheets, which exist to-day.

SUMMARY OF THE INVENTION

It is an object of this invention to provide a process for refining refuse which, on the one hand, is economical to carry out and, on the other hand, gives a satisfactory raw material for further conversion to a highly valuable end product, such as construction sheets.

Accordingly the present invention resides in a process of producing pressed bodies comprising preparing particulate material, adding adhesive binder thereto and pressing the resulting mixture into pressed bodies, the improvement comprising preparing said particulate material from municipal refuse by the steps of:

(a) dividing up collected refuse, without the addition of fluid, to reduce its particle size;

(b) drying the refuse particles in a hot gas until their water content is reduced to less than 15 weight percent; and (c) screening the resulting particles of refuse in a stream of air in order to separate particles of at least those heavy fractions of metal, glass and stone thereby leaving behind the desired particulate material.

The invention also includes a process for producing from municipal refuse particulate material suitable for fabricating pressed bodies therefrom which comprises steps (a) to (c) inclusive of the last preceding paragraph.

In contrast to that of Jetzer, the process of the present invention does not involve any intentional aerobic decomposition or composting which is worthy of mention. Furthermore, it gives rise to pressed sheets of a quality which lies insignificantly below that of corresponding sheets made of pure wood shavings and in every instance at a level which is satisfactory for most fields of use for such sheets.

A main advantage of the process of the present invention is that it makes available an economic treatment and utilisation of refuse within the framework of current commercial conditions, especially as regards the need for space and equipment. The exclusion of aerobic decomposition reduces the risk of the later growth of micro-organisms, something which simplifies the further treatment of the waste material and reduces the need for adding preservatives. Moreover, the absence of composting further increases the yield of end product since a smaller proportion of the refuse is destroyed and disappears as gas. In consequence, the present process does not result in the formation of gases with an unwelcome odour which means that it can be carried out in populated areas with high clean air standards without the need for special purification arrangements.

In the case of refuse which contains quantities of food residues and the like, protein- and nitrogen-containing waste portions exist capable of reacting with formaldehyde and thereby reducing formaldehyde evaporation which has hitherto been an embarassment in the case of pressed bodies produced using a urea-formaldehyde glue which is technically and economically most advantageous for such purposes.

It is thus practicable to effect the initial refinement of the refuse or waste close to its place of origin and hence transportation for the further treatment, in those instances where such transportation is necessary, is rendered cheaper by virtue of the reduction in volume.

Refuse, garbage or waste which has been refined to particle form immediately prior to the pressing step, can be used, for example, in the manufacture of sheets, plates or boards for construction purposes. Ingredients other than the adhesive and/or binding agent can, if desired, be added, such as shavings of the type utilised in the production of chipboard. Production can be performed in a manner corresponding to that used for making chipboard which involves a pressing and heat treatment. The refuse can also be utilised for making parts of laminated constructions of various kinds, for example, laminated sheets with plastic coatings, chipboard coatings and the like.

It should be realised that the term "municipal waste" in this specification is not intended to exclude straw, bark and other similar vegetable waste materials.

It has been found particularly convenient to mix the remaining refuse particles obtained as a result of the refinement of the starting material, with up to an equal proportion by weight of wood chips for pressing into construction sheets.

Desirably, the refuse is divided up to a particle size of less than 20 mm, and preferably less than 15 mm, for substantially all the particles.

The drying step is normally carried out in hot air until the water content of the refuse particles is reduced to a preferred level of less than 10 weight percent.

BRIEF DESCRIPTION OF DRAWINGS

In order that the invention can be more clearly understood, a preferred embodiment will now be described, by way of example, with reference to the accompanying drawing which is a schematic representation of a plant for carrying out the present invention.

DESCRIPTION OF PREFERRED EMBODIMENT

The drawing shows a plant which comprises a crusher 1 for breaking down the waste or refuse material, a subsequent magnetic separator 2 having a belt which passes over two rollers, for extracting ferromagnetic substances and a sieve 3 which allows fine material, such as dust, sand, bits of glass and the like, to pass through. After the sieve 3, a drier 4 is arranged which supplies hot air from a furnace 5 by means of a fan 6. From the drier 4, the waste material is led to a cyclone 7 in which the air is separated and led back to the feed conduit from the furnace 5.

In a subsequent air classifier 8, which is driven by a fan 9, heavy fractions, such as non-magnetic metals, glass, stone and the like, are separated. In a further cyclone 10, the air is separated from the remainder of the waste or refuse particles which is liberated for the further treatment.

In the preferred embodiment, the waste or refuse was finely divided in a hammer mill so that substantially all the particles had a particle size below 20 mm while the majority of the particles had a particle size of less than 15 mm. The particles were thereafter dried in air at 70° C., after the fine material had been removed by means of a sieve which allowed particles to pass through having a size below about 3 mm. In an air classifier of conventional design such heavy fractions as metal, glass, stone and the like were separated.

The particles of refuse were mixed with shavings designed for chipboard production in a weight ratio of 1:1 and thereafter urea-formaldehyde glue was added at ambient temperature and the mixture pressed for 150–210 seconds for various tests. A press pressure was employed which decreased in stages from 30–35 kp/cm² to 1.7–4.5 kp/cm². The press temperature was in the range of 200°–220° C. The sheets or plates produced in this way have been tested with a view to various constructional objectives under different conditions without exhibiting significant disadvantages.

It will be appreciated that the preferred embodiment can be modified in various ways, for example, by utilising a magnetic separator as described above and illustrated in the drawing.

The procedure outlined above makes it possible to treat solid municipal waste or refuse of various categories with a view to conversion into pressed bodies, without separating individual fractions, such as food residues and the like.

We claim:

1. In a process of producing pressed bodies comprising preparing particulate material, adding adhesive binder thereto and pressing the resulting mixture into pressed bodies, the improvement which comprises preparing said particulate material from municipal refuse by the steps of:
   (a) dividing up collected refuse, without the addition of fluid, to reduce its particle size;
   (b) drying the refuse particles in a hot gas until their water content is reduced to less than 15 weight percent; and
   (c) screening the resulting particles of refuse in a stream of air in order to separate particles of at least those heavy fractions of metal, glass and stone thereby leaving behind the desired particulate material.

2. The process in accordance with claim 1, which comprises mixing the remaining refuse particles with up to an equal proportion by weight of wood chips for pressing into construction sheets.

3. The process in accordance with claim 1, which comprises dividing up the refuse to a particle size which is less than 20mm for substantially all of the particles.

4. The process in accordance with claim 3, which comprises dividing up the refuse to a particle size which is less than 15mm for the majority of the particles.

5. The process in accordance with claim 3, which comprises removing material having a particle size of less than about 3 mm from the refuse of reduced particle size of step (a).

6. The process in accordance with claim 1, which comprises drying the refuse particles in hot air until the water content thereof is reduced to less than 10 weight percent.

7. The process in accordance with claim 6, which comprises effecting said screening after the hot air is removed from the refuse particles.

8. The process in accordance with claim 1, which comprises passing the refuse of reduced particle size of step (a) through a magnetic separator to extract ferromagnetic substances.

* * * * *